(12) United States Patent
Kornprobst et al.

(10) Patent No.: US 7,103,060 B2
(45) Date of Patent: Sep. 5, 2006

(54) EVENT TRIGGERED CHANGE OF ACCESS SERVICE CLASS IN A RANDOM ACCESS CHANNEL

(75) Inventors: Stefan Kornprobst, Glienicke (DE); Jens-Uwe Jürgensen, Fellbach (DE); Richard Stirling-Gallacher, Stuttgart (DE)

(73) Assignee: Sony International (Europe) GmbH, Berlin (DE)

( * ) Notice: Subject to any disclaimer, the term of this patent is extended or adjusted under 35 U.S.C. 154(b) by 1088 days.

(21) Appl. No.: 09/824,968

(22) Filed: Apr. 3, 2001

(65) Prior Publication Data

US 2001/0026539 A1 Oct. 4, 2001

(30) Foreign Application Priority Data

Apr. 4, 2000 (EP) .................................. 00107329

(51) Int. Cl.
*H04J 3/16* (2006.01)

(52) U.S. Cl. ....................... 370/437; 370/329
(58) Field of Classification Search ......... 370/310–350, 370/431–462, 470–474, 478–480; 455/422, 455/67.3, 561
See application file for complete search history.

(56) References Cited

U.S. PATENT DOCUMENTS 6,259,686 B1 * 7/2001 Blanc et al. ................ 370/337
6,333,789 B1 * 12/2001 Shima ....................... 358/1.15
6,597,682 B1 * 7/2003 Kari ........................... 370/348
6,788,943 B1 * 9/2004 Hamalainen et al. ....... 455/450

FOREIGN PATENT DOCUMENTS

WO   WO 97 19525   5/1997
WO   WO 99 44379   9/1999

* cited by examiner

*Primary Examiner*—David Vincent
(74) *Attorney, Agent, or Firm*—Frommer Lawrence & Haug LLP; William S. Frommer; Thomas F. Presson

(57) ABSTRACT

The present invention relates to a communication device (1) for transmitting and receiving data in a communication system and a corresponding communication method. In the communication system, which can be a wireless or a wired communication system, a random access channel is provided, which comprises a plurality of access resources. The access resources are divided in at least two access resource groups, each access resource groups corresponding to a different access service class with a respective access probability. The communication device (1) according to the present invention, comprises selecting means (5) for randomly selecting an access resource from an access resource group corresponding to the current access service class of the communication device (1), transmitting means (3) for transmitting a random access burst in said selected access resource and detecting means (6) for detecting a specific event, whereby the current access service class of the communication device (1) is changed into another access service class when said specific event is detected by the detecting means (6).

Figure 1:
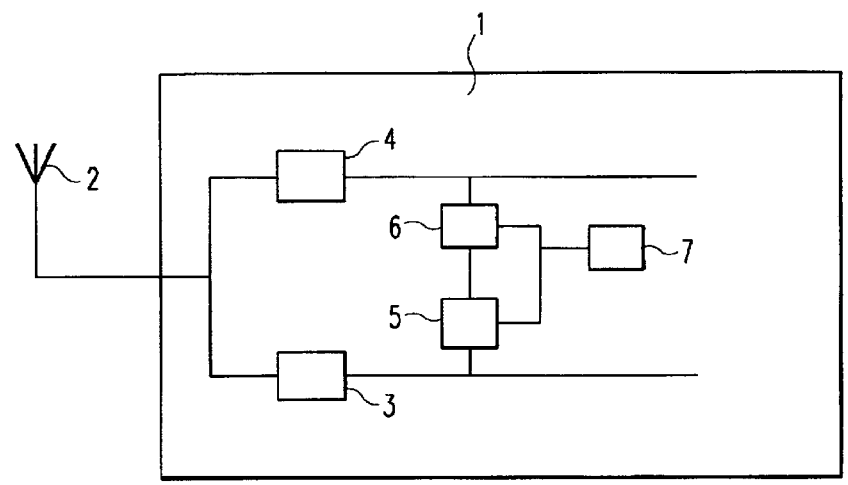

The present invention proposes a simple and flexible scheme for the adaptation of the performance of a communication device (1) in the random access procedure in the case of certain events.

21 Claims, 2 Drawing Sheets

EVENT TRIGGERED CHANGE OF ACCESS SERVICE CLASS IN A RANDOM ACCESS CHANNEL

The present invention relates to a communication device for transmitting and receiving data in a communication system and to a communication method for such a communication device. In the communication system, a random access channel is provided, whereby said random access channel provides a plurality of access resources. A random access channel is a communication channel used to build up a connection from one communication device to another communication device of the communication system. The communication system can thereby be a wireless communication system or a wired communication system or a mixture of both.

The access resources of the random access channel are randomly accessed by a communication device which for example wants to build up a connection or to send a short message. Thereby, the access is contention based which means that several communication devices trying to build up a connection might try to access the same access resource simultaneously. In wireless telecommunication systems, as for example the UMTS-system or a UMTS-like system, where a mobile station wanting to build up a connection and/or transmit data requests an access resource of an random access channel by randomly selecting an access resource and transmitting a preamble part of a random access burst to the base station. Hereby, the preamble part represents the request for the randomly selected access resource. A base station receiving the preamble part grants the requested access resource if it is available and sends a corresponding acknowledgement signal back to the mobile station. In a certain situation, for example, if no appropriate access resource is available on the network side, the base station transmits a negative acknowledgement signal back to the mobile station indicating that the requested access resource is not available. In case that the respective base station grants the request, it transmits a positive acknowledgement signal. The mobile station receiving the positive acknowledgement signal then transmits the message part of the random access burst, which contains the data upon which the building up of a connection or the transmission of data between the mobile station and the base station is based.

In case that several mobile terminals access the same access resource simultaneously, the base station is not able to receive the access requests and thus does not transmit any acknowledgement signal. The mobile terminals then have to send access requests again.

Depending on the respective communication system, the access resources may be time slots as in an TDMA (Time Divisional Multiple Access) system, frequencies as in a FDMA (Frequency Division Multiple Access) system, codes as in a CDMA (Code Division Multiple Access) system or mixtures thereof, as in the UMTS system, in which an access resource in the random access channel is defined by a time slot and a signature code.

The general problem is that the mechanism of gaining access to the access resources of the random access channel is contention based. In order to allow a more efficient access to the random access channel, different proposals have been made. For example, EP 98 118 819.6 which is a document according to article 54(3) EPC, proposes to divide the access resources of the random access channel into several groups, whereby each group corresponds to a respective priority class. Each priority class thereby represents the transmission priority of the random access data to be transmitted. Thus, the access requests for different kinds of data are transmitted with different priorities, so that certain kinds of data have a higher probability to gain access to an access resource of the random access channel than other kinds of data. This proposed system, however, is very inflexible, since a respective number of access resources is fixedly allocated to a specific kind of data. Further, the only criteria for the allocation of a specific access priority and thus the access probability is the data kind. WO 97/19525 proposes a more flexible system, in which the access of a random access channel in a communication system relies on the use of varying access probabilities for subscribers or messages of varying priority. Thereby, users, for example mobile terminals, are divided into different priority groups, whereby each group has a different access probability for accessing an access resource of the random access channel. Two basic schemes of the distribution and allocation of access probabilities to the users are proposed, namely a proportional priority distribution and a temporal priority distribution. In the proportional priority distribution, each group of users attempts access to all available access resources of the random access channel, but with different access probabilities. Each user group has a different access probability, but every access resource can be accessed by every user. In the temporal priority distribution, the highest priority user group, i. e. the user group having the highest access probability to the access resources, attempts access to all available access resources, whereby the lower priority user groups, i. e. the user groups having a lower access probability, only attempt access to a part of the available access resources. The disadvantage here is that access attempts of the highest priority user group have to content with the access attempts of all other priority groups. Thus, it is possible that an access attempt of a very high priority, as for example, an emergency call, is not successful since it has to content with other, lower priority access attempts.

The object of the present invention is therefore to provide a communication device for transmitting and receiving data in a communication system, and a communication method for a communication device of a communication system, which provides an improved, more effective and more flexible way of accessing access resources of a random access channel.

The above object is solved by a communication device for transmitting and receiving data in a communication system according to claim 1, whereby a random access channel is provided, said random access channel providing a plurality of access resources being divided in at least two access resource groups, each access resource group corresponding to a different access service class with a respective access probability. The communication device according to the present invention comprises selecting means for randomly selecting an access resource from an access resource group corresponding to the current access service class of the communication device, transmitting means for transmitting a random access burst in said selected access resource, and detecting means for detecting a specific event, whereby said current access service class of the communication device is changed into another access service class when said specific event is detected by said detecting means. The above object is further achieved by a communication method according to claim 12.

The present invention therefore provides a very flexible way of accessing access resources of a random access channel. The access service class of a communication device can be changed very easily upon occurrence of a predetermined event so that a higher or lower access probability to the access resources of the random access channel can be chosen depending on the respective requirements. The occurrence of certain events can automatically leads to a change of the quality and the priority of the following accesses depending on predefined rules. Thus, an easy and flexible adaptation of the performance and quality of the access can be achieved. Particularly, an access service class is not fixedly linked to a certain data type, so that the access service class may be changed even if the same type of data is to be transmitted. Advantageous features of the present invention are claimed in the respective subclaims. For example, it may be advantageous, if the access resources of the access resource group corresponding to the random access class having the highest random access probability are exclusively allocated to this access resource group. In this way it can be assured that very important access requests, as for example for an emergency call, do not have to content with other access requests and get an access resource granted very quickly.

Further advantageously, the access resources of each access resource group can be exclusively allocated to the respective access resource groups. In this case, the access resources of the random access channel are divided into different groups without any overlap between the different groups. Alternatively, it may be advantageous, if some of the access resources are allocated to two or more of the access resource groups.

Advantageously, the specific event is the reception of a predetermined number of negative acknowledgement signals from another communication device as after sending random access requests on said random access channel. For example, if a certain number of random access requests had been sent unsuccessfully and a predetermined number of negative acknowledgement signals had been received, the current access service class can be changed into another access service class having a higher access probability. Alternatively, it may be advantageous, if said specific event is a time point. For example, the current access service class can be changed into another access service class at certain time points. For example the access service class is changed at time points at which certain system parameters change regularly and a change of the access service classes is required. In this case the current access service class may for example be changed periodically.

Further advantageously, the rules according to which the current access service class is changed into another access service class are stored in a memory means. For example, the communication device according to the present invention may be a mobile station of a wireless telecommunication system, whereby the memory means is part of a subscriber identity module or a similar device which can be inserted into the mobile station. The rules according to which the current access service class is changed into another access service class may be received from another communication device, as for example a base station of a mobile telecommunication system. In this way, a flexible adaptation to varying system parameters and conditions can be achieved.

Further advantageously, the communication system is a wireless UMTS telecommunication system, whereby the access resources of the random access channel are defined by time slots and signature codes.

Figure 2:
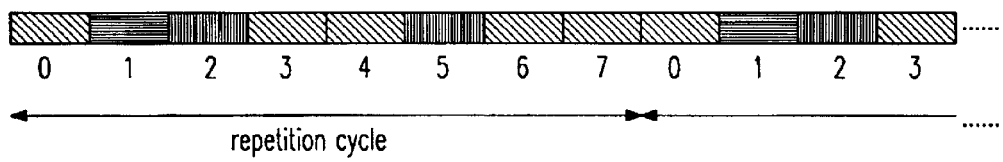
Figure 3:
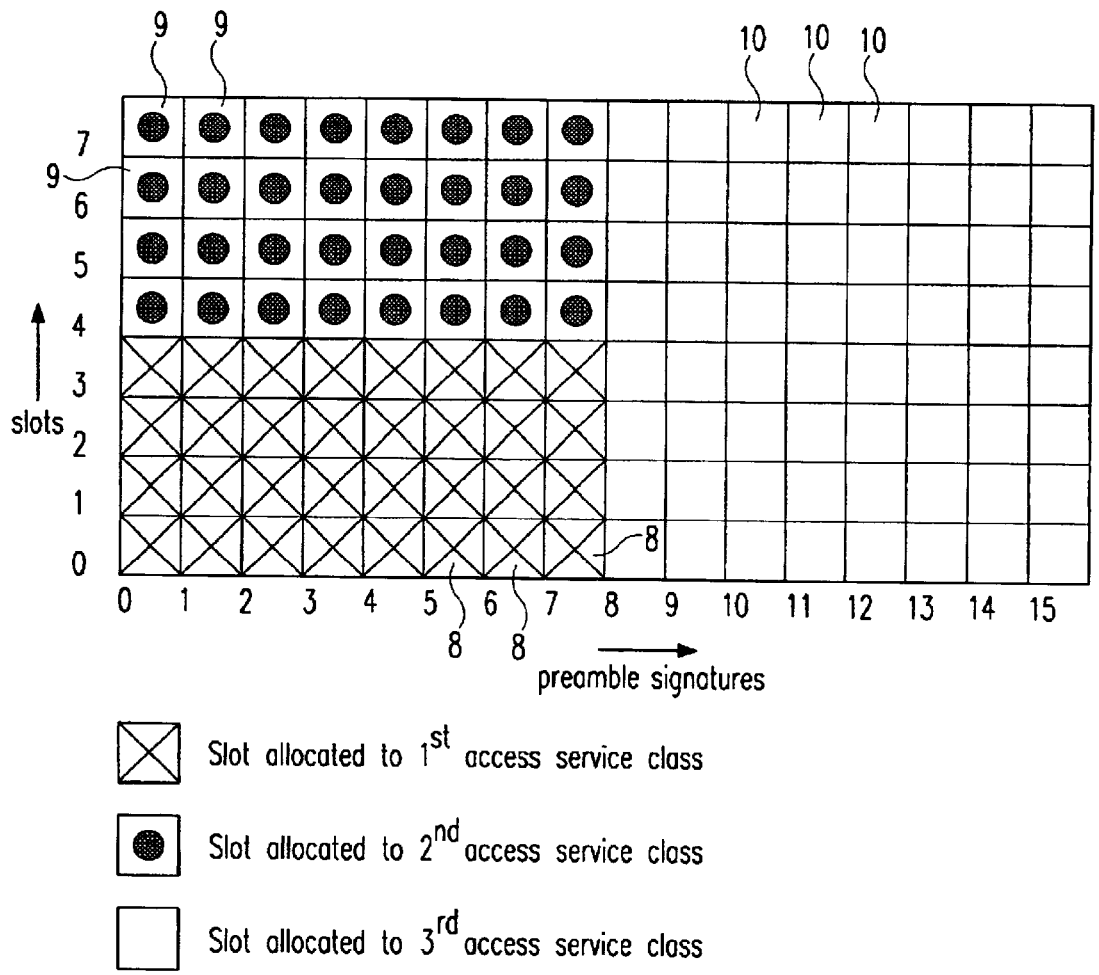

Advantageous embodiments of the present invention are explained in greater detail in the following description relating to the enclosed drawings, in which FIG. 1 shows a schematic diagram of a communication device according to the present invention, FIG. 2 shows a first example of dividing access resources into groups and FIG. 3 shows a second example of dividing access resources into groups.

FIG. 1 shows a schematic block diagram of a communication device 1 according to the present invention. The communication device 1 shown in FIG. 1 is a mobile terminal for a wireless telecommunication system and comprises an antenna 2 connected to a transmitting means 3 and a receiving means 4 for transmitting and receiving communication data to and from a base station or another mobile terminal of the wireless telecommunication system. The wireless telecommunication system can for example be the UMTS system or a UMTS-like system. The mobile terminal 1 thus comprises all necessary elements for communicating and processing data, such as coders, decoders, modulators, demodulators and the like, although these elements are not shown in FIG. 1 and not explained in the present application. It is to be noted, that the mobile terminal 1 shown in FIG. 1 is only used as an example for the communication device according to the present invention, which may also be an end terminal in a wired communication system, such as a telephone apparatus, a personal computer or the like.

The communication system, in which the communication device 1 according to the present invention operates and in which the communication method according to the present invention is performed, comprises a random access channel (RACH) providing a plurality of access resources. These resources are used by the communication device 1 to build up a connection. In case of a wireless telecommunication system, a mobile terminal uses the access resources of the random access channel to transmit an access request to a corresponding base station. In the UMTS system or a UMTS-like system, the access request is transmitted in the preamble part of the random access burst as explained above. The access resources are thereby accessed randomly, which leads to a contention based access mechanism. Several access requests coming from different mobile terminals may compete or content for the same access resource at the base station. In this case the base station does not receive any access request transmitted from the mobile terminals and the mobile terminals do not receive any acknowledgement signal and have to send the access requests again after a certain time period. The same scheme applies to communication devices which are connected through a wired network.

According to the present invention, the plurality of access resources of a random access channel is divided into at least two access resource groups. Each access resource group corresponds to a different access service class with a respective access probability. Each communication device of the communication system is allocated to one of the access resource groups and therefore has a current access service class. Each access service class corresponds to a respective access probability so that each communication device of one access resource groups has the same access probability to access one of the access resources of the respective access resource group. Thus, different access service classes can be defined, each access service class having a different access probability. If, for example, three access services classes are defined, a first access service class may have high priority and a high access probability, a second access service class may have a medium priority and a medium access probability and a third access service class may have a low priority and thus a low access probability. In a standard setting, for example, each type of data for a given communication device may be allocated to one of the access resource groups. Each time a specific data type is to be transmitted in the random access channel, a corresponding access probability is valid. According to the present invention, the corresponding access service class is changed upon the occurrence of a specific event.

The communication device 1 shown in FIG. 1 comprises a selecting means 5 connected to the transmitting means 3. The selecting means 5 randomly selects an access resource from an access resource group corresponding to the current access service class of the communication device 1. Thus, if the communication device 1 or its user wants to build up a connection, an access resource is randomly selected by the selecting means 5 and an access request is transmitted via the transmitting means 5 and the antenna 2 to a corresponding base station. In case that the request is granted, the base station transmits a positive acknowledgement signal which is received by means of the antenna 2 and the receiving means 4 of the communication device 1. The positive acknowledgement signal received by the receiving means 4 is further processed in the communication device 1 and the actual data for building up a connection and/or transmitting data are transmitted thereafter in the granted access resource. These mechanisms are well known and do not need to be described in further detail. An important feature, however, is that the access request already carries the information on the randomly selected access resource so that upon grant of the requested access resource the corresponding connection data are automatically transmitted in that access resource.

The selecting means 5 always selects the access resource from an access resource group corresponding to the current access service class of the communication device 1. According to the present invention, this current access service class can be changed upon detecting a specific event in a detecting means 6 which is connected to the receiving means 4 and the selecting means 5. In this way, the access probability can be changed to a higher or lower access probability depending on the detected specific event and corresponding rules which are stored in a memory means 7 connected to the detecting means 6 and the selecting means 5. The rules stored in the memory means 7 thereby define to which access service class the current access service class of the communication device 1 is changed upon the detection of a specific event. The specific event is for example the reception of a predetermined number of negative acknowledgement signals after sending an access request. In this case, the current access service class could be changed into another access service class having a higher priority and a higher probability that an access is granted. Alternatively, the specific event could be the immediately successful transmission of the predetermined number of access grants and a corresponding reception of positive acknowledgement signals. In this case, the current access service class could be changed into a lower priority class having a lower access probability. Other possibilities is to specify the specific event as a time point so that, for example, specific time points could be defined, at which it is statistically known that users of the communication system change their behaviour in respect to the transmission of access requests. Further, the current access service class may be changed periodically. It is to be noted that any kind of a specific event could be defined, upon the detection of which the current access service class is changed. Further, a combination of different kinds of events can be defined. The change of the access service class is hereby independent from the specific kind of data to be transmitted.

The rules, according to which the current access service class is changed into another access service class upon detection of a specific event in the detecting means 6 are stored in memory means 7. Thereby, the memory means 7 can be a fixed part of the communication device 1. Alternatively, the memory means 7 can be part of a device which can be inserted into the communication device 1. In this case, the memory means 7 may for example be part of a device which has an inherent association with the user and which is usually inserted into the communication device, as for example a unified subscriber identity module (USIM) card in case of the UMTS system. Further, the rules could be received from another communication device, such as a base station and then stored in the memory means 7. Also, a combination of the above-mentioned possibilities could be realised, for example rules could be stored on a subscriber identity module as well as in a fixed memory means of the communication device 1. In this case, when a subscriber identity module is inserted and connected to the communication device 1, the rule stored in the fixed memory means could be overwritten or overruled by the rules stored in the memory means of the subscriber identity module. Further, new rules received from another communication device could be used to overwrite or overrule the current rule stored on a subscriber identity module and/or a fixed memory means of the communication device 1. In this way, it is possible to flexibly adapt the rules for changing the communication device 1 from a current access service class into another access service class to varying system parameters.

FIGS. 2 and 3 show a first and a second example, respectively, of access resources being divided in two ore more access resource groups according to the present invention. Generally, the access resources can be defined by a frequency, a time slot or a code or any combination thereof depending on the multiple access scheme used in the corresponding wireless or wired communication system. FIG. 2 shows an example, in which the access resources of the random access channel are time slots. One repetition cycle of the random access time window comprises for example eight time slots 0, 1, . . . 7. In the example shown in FIG. 2, the available eight access resources or time slots are divided into three access service groups, each corresponding to a different access service class with respective access probability. The first group comprises the five time slots 0, 3,4, 6, 7 indicated by the diagonal pattern, the second access resource group comprises two time slots 2, 5 indicated by the vertical pattern and the third access recourse group comprises one time slot 1, indicated by the horizontal pattern. Communication devices being currently allocated to the first access service class corresponding to the first access resource group therefore have a higher probability to gain access, since there is a higher number and a larger capacity of access resources are available. This is of course only true when approximately an equal number of communication devices is allocated to each access service class. A communication device being currently allocated to the third access service class corresponding to the third access resource group has only a single time slot in each random access time window to gain access and thus has a low probability leading to a poorer performance. Upon detection of a specific event, a communication device belonging to the third access service class may be switched into the second access service class or the first access service class depending on the change rules.

FIG. 3 shows a second example of access resources being divided into access resource groups according to the present invention. In the shown example, an access resource is defined by a time slot (or time offset) and a preamble signature (or signature code). In a UMTS system, for example, a random access channel comprises up to 15 time slots and 16 preamble signatures within two radio frames or two random access time windows, so that up to 240 access resources are available in total. FIG. 3 shows a corresponding example with eight time slots 0, 1, ... 7 and 16 preamble signatures 0, 1, ... 15. The access resources are divided into three access resource groups. The access resources indicated by a cross from the first access resource group are defined by the time slots 0, 1, 2, 3 and the preamble signatures 0, 1, 2, 3, 4, 5, 6, 7 and correspond to a first access service class. The access resources indicated by a point form of the second access resource group are defined by the time slots 4, 5, 6, 7 and the preamble signatures 0, 1, 2, 3, 4, 5, 6, 7 and correspond to a second access service class. The access resources indicated by a blank square form of the third access research group, are defined by the time slots 0, 1, 2, 3, 4, 5, 6, 7 and the preamble signatures 8, 9, 10, 11, 12, 13, 14, 15 and correspond to a third access service class. In both examples shown in FIG. 2 and 3, the access resources are properly divided into several groups without any overlap between the groups. However, an overlap between the groups is possible, which means that one ore more access resources may belong to two or more access resource groups.

The communication device and the communication method according to the present invention provide a simple and effective way of flexibly adapting the performance of a communication device within the random access procedure upon the occurrence of certain events. The proposed scheme deals with changing access service classes and is particularly advantageous for very high priority kind of data, as for example, emergency calls, which can be allocated to a high priority access service class with an exclusive access resource group in which no competition with other non-emergency calls is occurring.

We claim:

1. A communication device for transmitting and receiving data in a communication system, in which a random access channel is provided, said random access channel providing a plurality of access resources being divided in at least two access resource groups, each access resource group corresponding to a different access service class, whereby said access resources of said random access channel are defined by time slots and signature codes, comprising:
    selecting means for randomly selecting an access resource from an access resource group corresponding to the current access service class of the communication device;
    transmitting means for transmitting a random access burst in said selected access resource; and
    detecting means for detecting a specific event,
    whereby said current access service class of the communication device is changed into another access service class when said specific event is detected by said detecting means.

2. The communication device according to claim 1, wherein, the access resources of the access resource group corresponding to the random access class having the highest random access probability are exclusively allocated to the access resource group.

3. The communication device according to claim 1, wherein the access resources of each access resource group are exclusively allocated to their respective access resource group.

4. The communication device according to claim 1, wherein some access resources are allocated to two or more access resource groups.

5. The communication device according to claim 1, wherein rules according to which said current access service class is changed into another access service class are stored in a memory means.

6. The communication device according to claim 5, wherein said memory means is part of a subscriber identity module.

7. The communication device according to claim 1, wherein rules according to which said current access service class is changed into another access service class are received from another communication device.

8. The communication device according to claim 1, wherein said specific event is the reception of a predetermined number of negative acknowledgment signals from another communication device after sending random access requests on said random access channel.

9. The communication device according to claim 1, wherein said specific event is a time point.

10. The communication device according to claim 1, wherein said current access service class is changed periodically.

11. The communication device according to claim 1, wherein said communication system is a wireless UMTS telecommunication system.

12. A communication method for a communication device of a communication system, in which a random access channel is provided, said random access channel providing a plurality of access resources being divided in at least two access resource groups, each access resource group corresponding to a different access service class, whereby said access resources of said random access channel are defined by time slots and signature codes, comprising the steps of:
    randomly selecting an access resource from an access resource group corresponding to the current access service class of the communication device, transmitting a random access burst in said selected access resource; and
    detecting a specific event, whereby said current access service class of the communication device is changed into another access service class when said specific event is detected.

13. The communication method according to claim 12, wherein the random access resources of the access resource group corresponding to the random access class having the highest random access probability are exclusively allocated to this access resource group.

14. The communication method according to claim 12, wherein the random access resources of each access resource group are exclusively allocated to their respective access resource group.

15. The communication method according to claim 12, wherein some random access resources are allocated to two or more access resource groups.

16. The communication method according to claim 12, wherein rules according to which said current access service class is changed into another access service class are stored in and read from a memory means.

17. The communication method according to claim 12, wherein rules according to which said current access service class is changed into another access service class are transmitted from another communication device of the communication system.

18. The communication method according to claim 12, wherein said specific event is the reception of a predetermined number of negative acknowledgment signals from another communication device after sending random access requests on said random access channel.

19. The communication method according to claim 12, wherein said specific event is a time point.

20. The communication method according to claim 19, wherein said current access service class is changed periodically.

21. The communication method according to claim 12, wherein said communication system is a wireless UMTS telecommunication system.

* * * * *